United States Patent
Tung

(10) Patent No.: US 9,016,302 B2
(45) Date of Patent: Apr. 28, 2015

(54) COLD/HOT WATER BALANCE VALVE WITH BURN-PROOF FUNCTIONS

(75) Inventor: Ping-Jung Tung, Taichung (TW)

(73) Assignees: Ping-Jung Tung, Taichung (TW); Paijo Co., Ltd., Changhua, Changhua County (TW)

( * ) Notice: Subject to any disclaimer, the term of this patent is extended or adjusted under 35 U.S.C. 154(b) by 870 days.

(21) Appl. No.: 13/269,813

(22) Filed: Oct. 10, 2011

(65) Prior Publication Data

US 2013/0087231 A1    Apr. 11, 2013

(51) Int. Cl.
*F16K 11/07* (2006.01)
*F16K 11/048* (2006.01)

(52) U.S. Cl.
CPC ........... *F16K 11/048* (2013.01); *F16K 11/0716* (2013.01)

(58) Field of Classification Search
CPC .............................. F16K 11/048; F16K 11/0716
USPC .................... 137/98, 99, 100, 625.17, 625.41, 137/625.46, 625.48, 625.49, 625.5
See application file for complete search history.

(56) References Cited

U.S. PATENT DOCUMENTS

| | | | |
|---|---|---|---|
| 3,192,939 A * | 7/1965 | Moen | 137/100 |
| 4,243,063 A * | 1/1981 | Parkison | 137/100 |
| 4,979,530 A * | 12/1990 | Breda | 137/100 |
| 5,299,593 A * | 4/1994 | Ottelli | 137/100 |
| 5,725,010 A * | 3/1998 | Marty et al. | 137/100 |
| 5,839,471 A * | 11/1998 | Yang | 137/625.18 |
| 5,875,808 A * | 3/1999 | Chen | 137/100 |
| 5,884,653 A * | 3/1999 | Orlandi | 137/100 |
| 5,983,918 A * | 11/1999 | Chang | 137/98 |
| 6,176,250 B1 * | 1/2001 | Lin et al. | 137/98 |
| 6,263,899 B1 * | 7/2001 | Zindler | 137/98 |
| 6,267,134 B1 * | 7/2001 | Chen | 137/98 |
| 6,412,513 B1 * | 7/2002 | Yang | 137/100 |
| 6,880,565 B2 * | 4/2005 | Ouyoung | 137/98 |
| 7,806,134 B1 * | 10/2010 | Chang | 137/98 |
| 7,918,241 B1 * | 4/2011 | Chang | 137/98 |
| 8,267,111 B2 * | 9/2012 | Yang | 137/100 |
| 8,408,231 B2 * | 4/2013 | Lo et al. | 137/98 |

* cited by examiner

*Primary Examiner* — William McCalister
(74) *Attorney, Agent, or Firm* — Egbert Law Offces, PLLC

(57) ABSTRACT

A cold/hot water balance valve prevents burning or scalding of the users. The valve is accommodated in the holding space preset into a dual-temperature ceramic valve. The balance valve mainly includes a hot water stop flange, protruded from a first lateral end wall, and meshed with a first end of a moveable spool to block a hot water stream when the first end shifts towards the first lateral end wall. A minimum cold water retaining portion is protruded from the second lateral end wall. When the second end of the moveable spool shifts towards the second lateral end wall, the minimum cold water retaining portion will be abutted onto the second end of the moveable spool, such that a minimum flow gap is reserved between the second end and the second lateral end wall, allowing for constant flow of water stream through the cold water slot of the moveable spool.

5 Claims, 6 Drawing Sheets

COLD/HOT WATER BALANCE VALVE WITH BURN-PROOF FUNCTIONS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a balance valve assembly used in a water control valve, and more particularly to an innovative one which is designed with burn-proof functions.

2. Description of Related Art Including Information Disclosed Under 37 CFR 1.97 and 37 CFR 1.98.

Given the fact that conventional dual-temperature ceramic valves may lead to transient burning and scalding due to manual error in turning the faucet, and the difficulty in regulating water temperature due to unstable water pressure, an improved structure of a dual-temperature ceramic valve combined with a cold-hot water balance valve has thus been developed in this industry.

In spite of currently available ceramic products and relevant patents based on balance valves, some shortcomings and disadvantages still exist.

A conventional balance valve generally comprises a fixed valve pipe and a moveable spool. Of which, a through-hole is set separately at both ends of the fixed valve pipe, and an opening arranged separately at its both sides so as to guide cold and hot water. An inner groove is formed separately at both ends of the moveable spool, and separated by a partition. Moreover, these two inner grooves are provided with an opening connected with that of the fixed valve pipe. With this structure, when cold and hot water separately pass through two inner grooves of the moveable spool via the openings at both sides of the fixed valve pipe, the moveable spool will yield reciprocating transverse movement with the variation of cold/hot water streams' flow velocity, based on the principle of higher velocity versus smaller pressure and smaller velocity versus bigger pressure as well as the property of water flow. This will change the sectional connection area between the moveable spool and the openings at both sides of the fixed valve pipe, serving the purpose of auto balancing of cold/hot water temperature.

However, the following shortcomings of typical balance valves are found during actual applications:

First, when a faucet is turned manually to full hot water mode, cold water passing the balance valve will be fully blocked, and the water flow is under a stagnant state. In such a case, the moveable spool in the balance valve will be shifted towards the hot water side until the preset end due to bigger pressure at cold water side, so the sectional area of hot water flow channel will be minimized. However, hot water stream cannot be fully blocked off, namely, hot water stream will continuously flow out of the faucet along the hot water flow channel of the ceramic valve, leading to scalding of the users. As most of users believe that the so-called faucet of balance structure could avoid scalding, accurate temperature control is often neglected, giving prominence to the structural design of such balance valve for safety guarantee.

Second, and on the other hand, if a conventional dual-temperature ceramic valve is combined with the cold-hot water balance valve, and the faucet is fully turned to full cold water mode, the shift direction of the moveable spool in the balance valve will almost block off the cold water flow channel, affecting heavily or even leading to loss of cold water supply function of the faucet.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

BRIEF SUMMARY OF THE INVENTION

The primary objective of the present invention is to provide a cold/hot water balance valve with burn-proof functions through breakthrough development for a more ideal and applicable product. Said balance valve is accommodated in a holding space preset into a dual-temperature ceramic valve. The holding space has a cold water inlet and a hot water inlet arranged at interval on the bottom, a cold water outlet and a hot water outlet arranged at interval on the top, as well as a first and a second lateral end wall at both ends. The cold-hot water balance valve comprises a fixed valve pipe and a moveable spool, of which the fixed valve pipe has a first port opposite to the first lateral end wall, a second port opposite to the second lateral end wall, a cold water opening connected with the cold water inlet, and a hot water opening connected with the hot water inlet. The first port is connected with the hot water outlet, and the second port connected with the cold water outlet. The moveable spool is transversely assembled into the fixed valve pipe in a transverse movement state. The moveable spool is provided with a first end and a second end. Of which, the first end is recessed to form a hot water slot, and the second end is recessed to form a cold water slot. The hot and cold water slots are separated by a partition. Further, the hot water slot is provided with a hot water punch hole connected with the hot water opening of the fixed valve pipe, and the cold water slot is provided with a cold water punch hole connected with the cold water opening of the fixed valve pipe.

The present invention is characterized in that it mainly comprises: a hot water stop flange, protruded from the first lateral end wall, and meshed with the first end of the moveable spool to block off tightly hot water stream when the first end shifts towards the first lateral end wall; a minimum cold water retaining portion, protruded from the second lateral end wall; when the second end of the moveable spool shifts towards the second lateral end wall, the minimum cold water retaining portion will be abutted onto the second end of the moveable spool, such that a minimum flow gap is reserved between the second end and the second lateral end wall, allowing for constant flow of water stream through the cold water slot of the moveable spool. The present invention has the following advantages as compared with prior art:

First, when the dual-temperature ceramic valve is switched to full hot water mode, the cold/hot water balance valve can block off hot water stream and prevent scalding.

Second, when the dual-temperature ceramic valve is switched to full cold water mode, the cold/hot water balance valve enables continuous flow of cold water stream, such that cold water supply function will not be lost.

Based on the technical characteristics wherein said hot water stop flange is protruded from the first lateral end wall of the holding space, and meshed with the first end of the moveable spool, this could block off tightly the hot water stream when the first end shifts towards the first lateral end wall. With this unique structural design, when the dual-temperature ceramic valve is switched to full hot water mode, the cold/hot balance valve can block off the hot water stream and prevent scalding with improved safety performance and applicability.

Based on the technical characteristics wherein said minimum cold water retaining portion is protruded from the second lateral end wall of the holding space, and abutted onto the second end of the moveable spool when the second end of the moveable spool shifts towards the second lateral end wall, a minimum flow gap is reserved between the second end and the second lateral end wall, allowing for constant flow of water stream through the cold water slot of the moveable spool. With this unique structural design, when the dual-temperature ceramic valve is switched to full cold water mode, the cold/hot balance valve enables continuous flow of cold water, such that the dual-temperature ceramic valve equipped with such balance valve still has the function of full cold water supply with better applicability.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
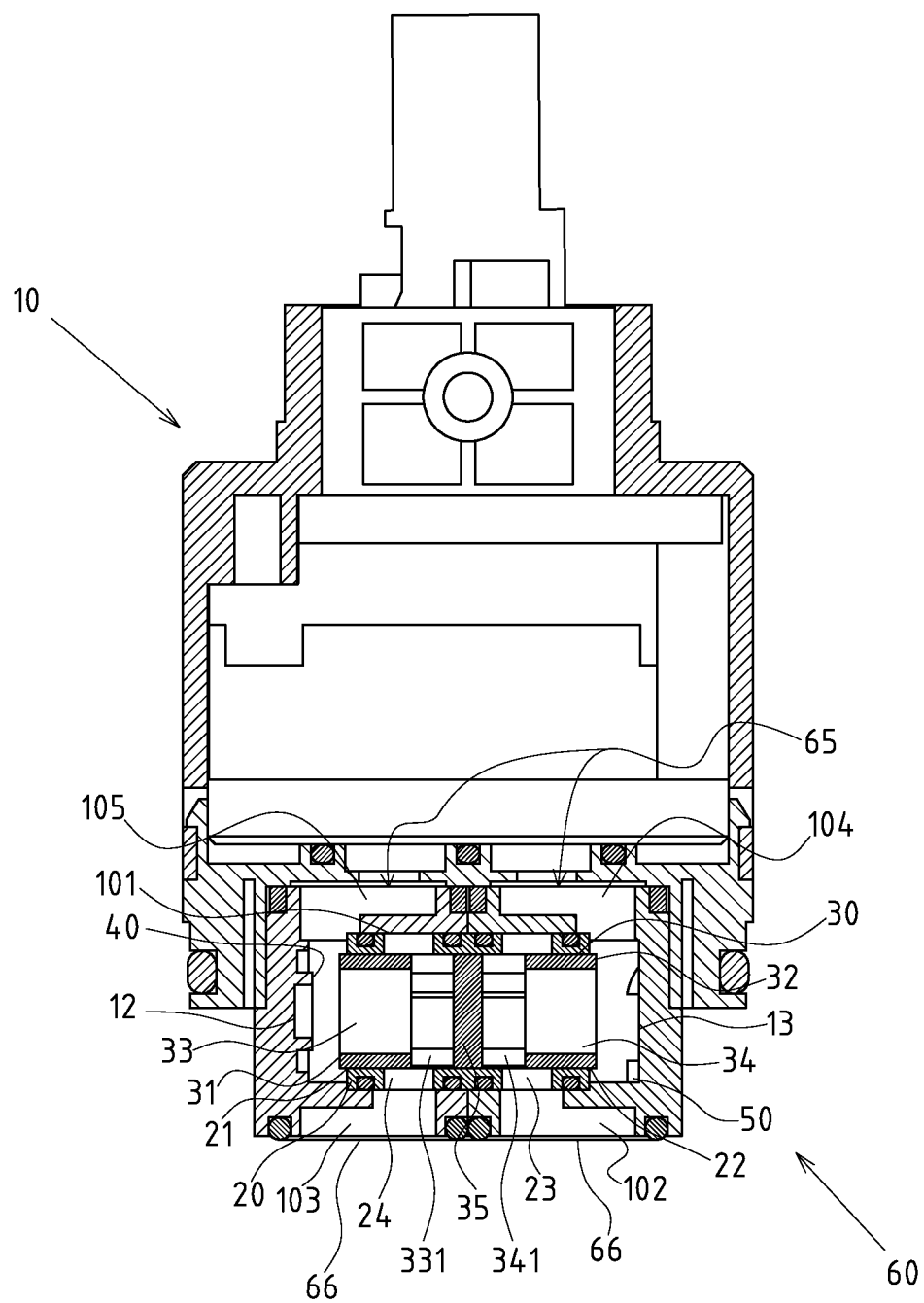
FIG. 1 is a sectional view of burning-proof balance valve assembly of the present invention.
Figure 2:
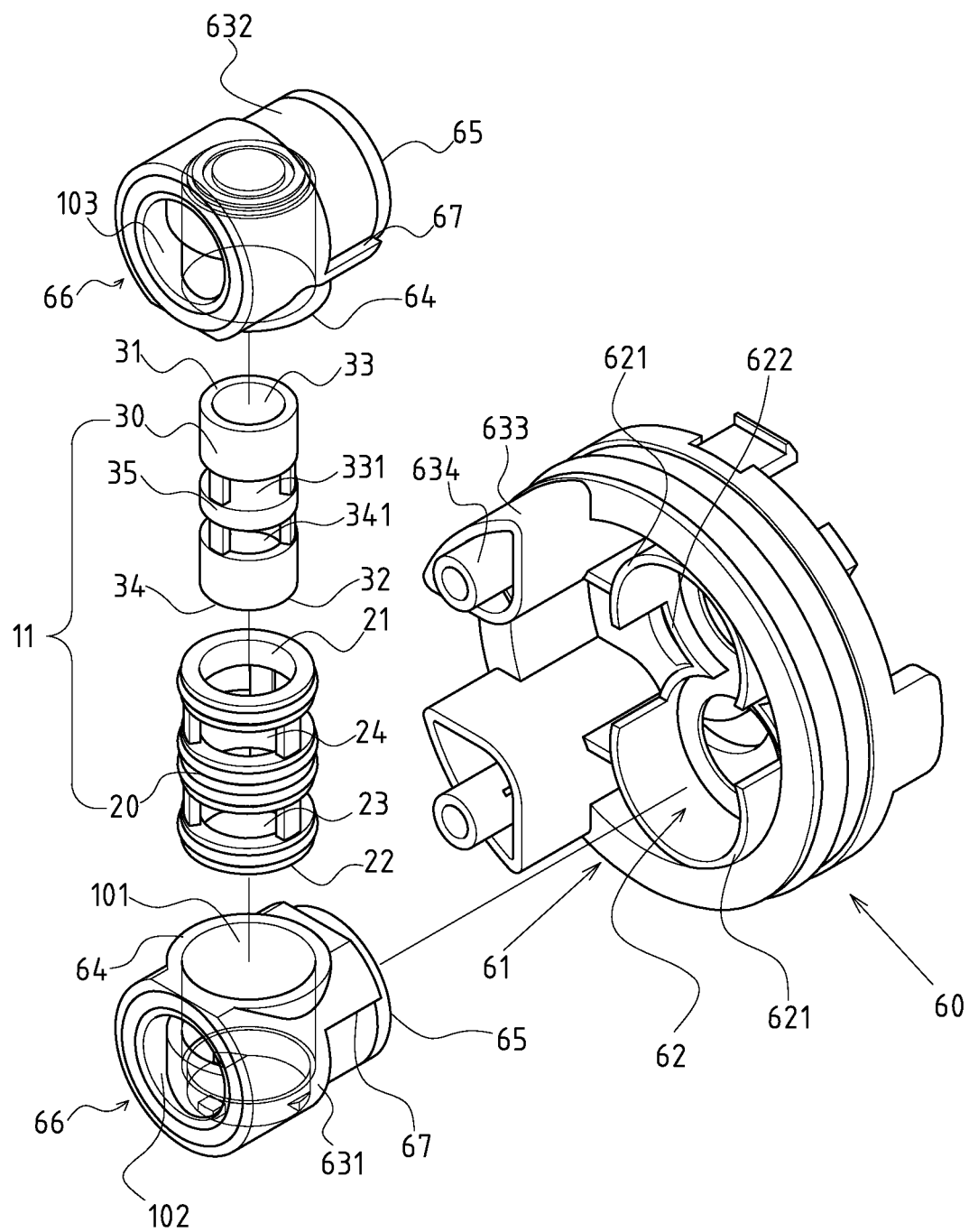
FIG. 2 is an exploded perspective view of the long-legged pedestal of the present invention.
Figure 3:
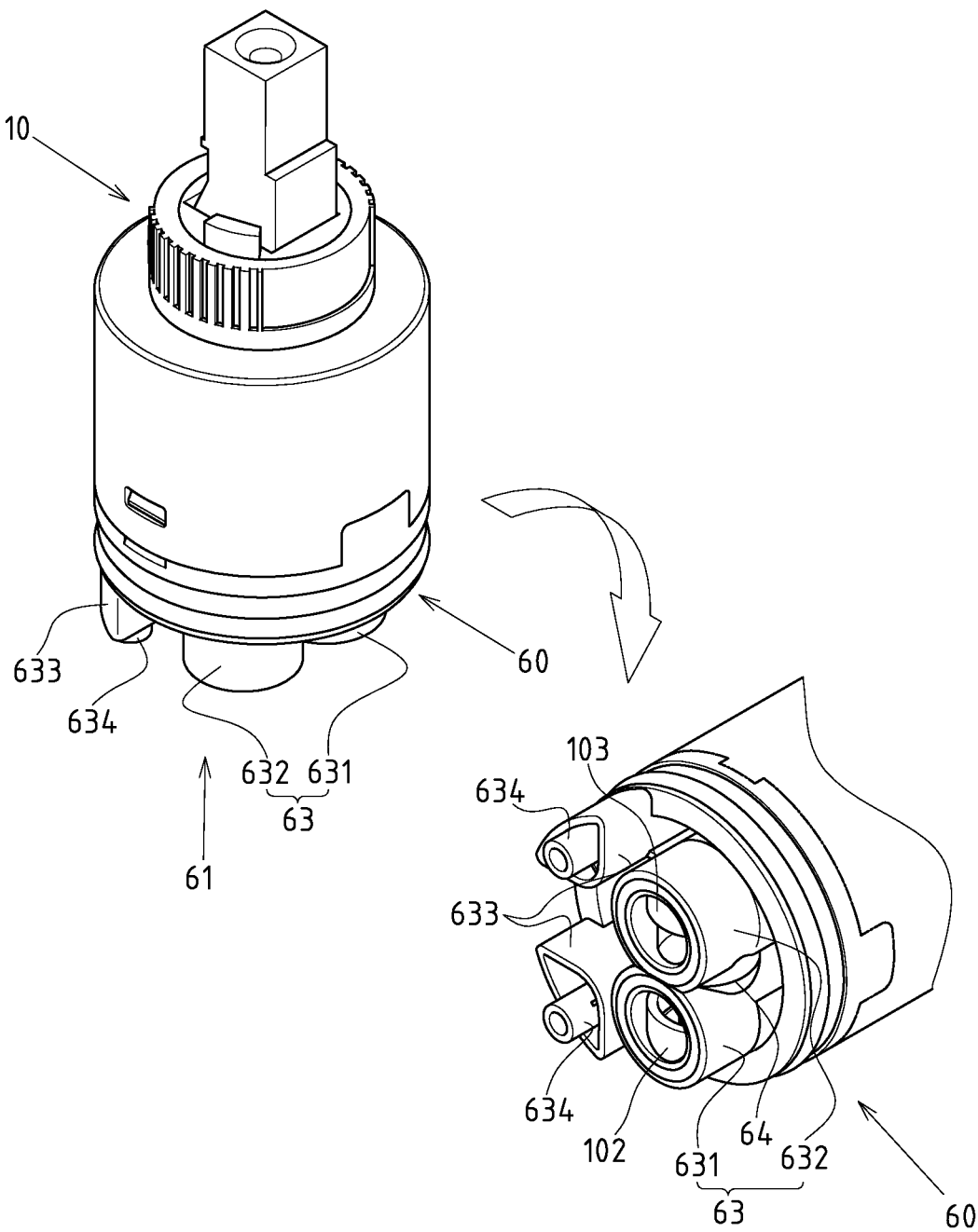
FIG. 3 is an assembled perspective view of the long-legged pedestal of the present invention.
Figure 4:
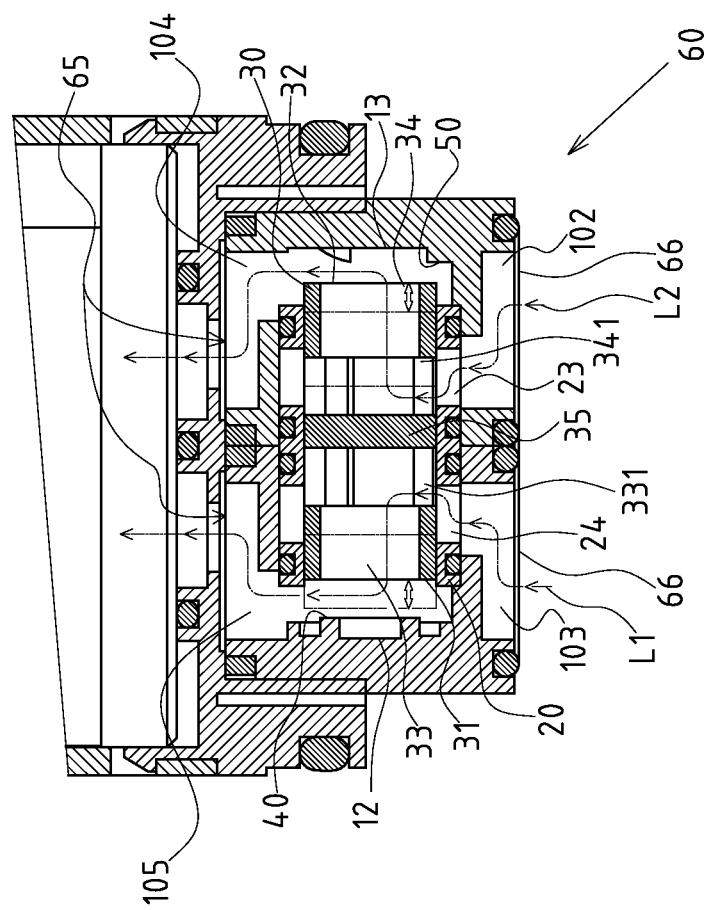
FIG. 4 is a sectional view of the water flow state of the burning-proof balance valve of the present invention.

FIGS. 1-4 depict preferred embodiments of a burning-proof balance valve of the present invention, which, however, are provided for only explanatory objective for patent claims. Said balance valve 11 is accommodated in a holding space 101 (shown in FIG. 2) preset into a dual-temperature ceramic valve 10. The holding space 101 has a cold water inlet 102 and a hot water inlet 103 arranged at interval on the bottom, a cold water outlet 104 and a hot water outlet 105 arranged at interval on the top, as well as a first lateral end wall 12 and a second lateral end wall 13 at both ends.

Said balance valve 11 includes a fixed valve pipe 20, a transverse hollow pipe, having a first port 21 opposite to the first lateral end wall 12, a second port 22 opposite to the second lateral end wall 13, a cold water opening 23 connected with the cold water inlet 102, and a hot water opening 24 connected with the hot water inlet 103. Moreover, the first port 21 is connected with the hot water outlet 105, and the second port 22 connected with the cold water outlet 104.

A moveable spool 30 is transversely assembled into the fixed valve pipe 20 in a transverse movement state. The moveable spool 30 is provided with a first end 31 and a second end 32, of which the first end 31 is recessed to form a hot water slot 33, and the second end 32 is recessed to form a cold water slot 34. The hot water slot 33 and cold water slot 34 are separated by a partition 35. Further, the hot water slot 33 is provided with a hot water punch hole 331 connected with the hot water opening 24 of the fixed valve pipe 20, and the cold water slot 34 is provided with a cold water punch hole 341 connected with the cold water opening 23 of the fixed valve pipe 20.

A hot water stop flange 40 is protruded from the first lateral end wall 12 of the holding space 101, and meshed with the first end 31 of the moveable spool 30 to block off tightly hot water stream when the first end 31 shifts towards the first lateral end wall 12. In this preferred embodiment, the hot water stop flange 40 is of a protruding ringed body.

A minimum cold water retaining portion 50 is protruded from the second lateral end wall 13 of the holding space 101. When the second end 32 of the moveable spool 30 shifts towards the second lateral end wall 13, the minimum cold water retaining portion 50 will be abutted onto the second end 32 of the moveable spool 30, such that a minimum flow gap W is reserved between the second end 32 and the second lateral end wall 13, allowing for constant flow of water stream through the cold water slot 34 of the moveable spool 30. In this preferred embodiment, the minimum cold water retaining portion 50 contains at least a bulge set on said second lateral end wall 13.

When the dual-temperature ceramic valve 10 is switched to full hot water mode, the cold/hot water balance valve 11 can effectivel block off hot water stream and prevent scalding. When the dual-temperature ceramic valve 10 is switched to full cold water mode, the cold/hot water balance valve 11 enables continuous flow of cold water stream.

Furthermore, the bottom of the dual-temperature ceramic valve 10 includes a long-legged pedestal 60 (in collaboration with FIGS. 2, 3), at bottom 61 of which an inlet pipe groove 62 is set for assembly and positioning of a combined inlet pipe assembly 63. The combined inlet pipe assembly 63 has a cold water pipe 631 and a hot water pipe 632. Two protruding footstands 633 are set laterally at the bottom 61 of the long-legged pedestal 60. An embedded column 634 is set at bottom of two protruding footstands 633. Of which, the cold, hot water pipes 631, 632 of the combined inlet pipe assembly 63 have lower nozzles 66 arranged at interval at bottom, which are mated closely with the upper nozzles 65 of the inlet pipe groove 62 and the open abutting side 64. The abutting sides 64 of the cold/hot water pipes 631, 632 are assembled to form a holding space 101 for the balance valve 11. Of which, the inlet pipe groove 62 is shaped by a convex ringed frame 621, and a non-equilateral, anti-dull embedded groove 622 is partially set on the convex ringed frame 621, such that a non-equilateral, anti-dull embedded flange 67 is set laterally on upper nozzles 65 of the cold/ hot water pipes 631, 632 of the combined inlet pipe assembly 63. With the mating of non-equilateral, anti-dull embedded groove 622 on convex ringed frame 621 of the inlet pipe groove 62 and non-equilateral, anti-dull embedded flange 67 laterally on upper nozzles 65 of cold/hot water pipes 631, 632, any possible error of assembly direction could be avoided when the combined inlet pipe assembly 63 is assembled into the inlet pipe groove 62.

Based on above-specified structure, the present invention is operated as follows.

Figure 5:
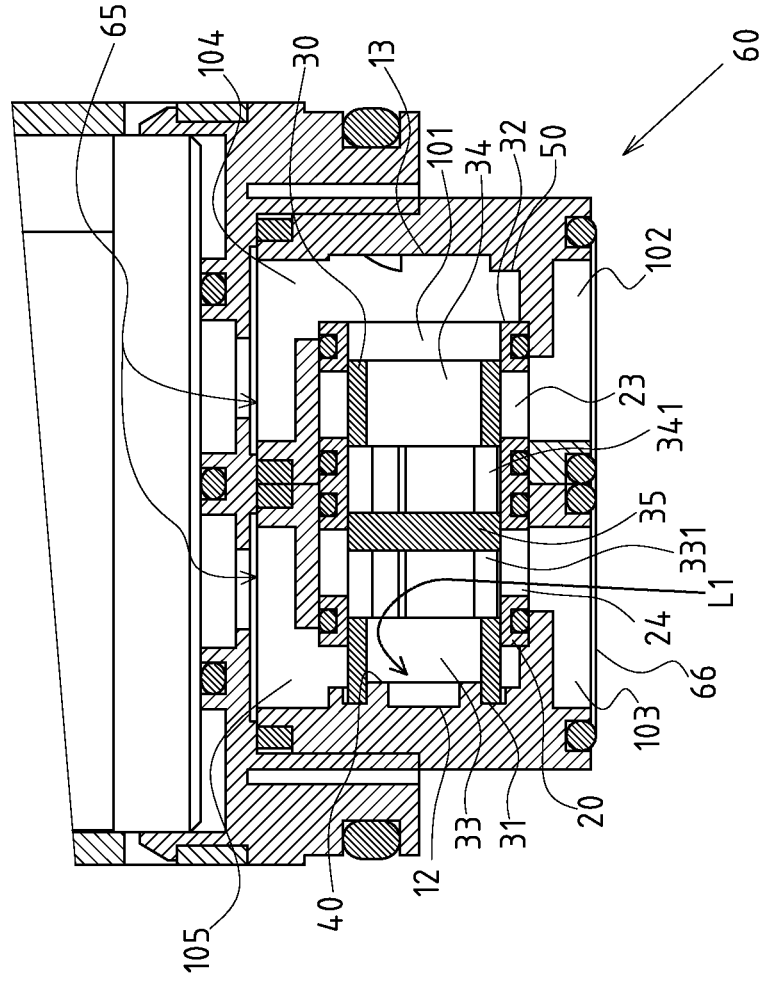
FIG. 5 is a sectional view of the burning-proof balance valve of the present invention when full hot water mode is activated.

Referring to FIG. 5, when the user switches the water supply mode to full hot water mode, the moveable spool 30 shifts towards the first lateral end wall 12, so the hot water stop flange 40 is meshed with the first end 31 of the moveable spool 30, disabling the flow of hot water L1 to prevent any scalding.

Figure 6:
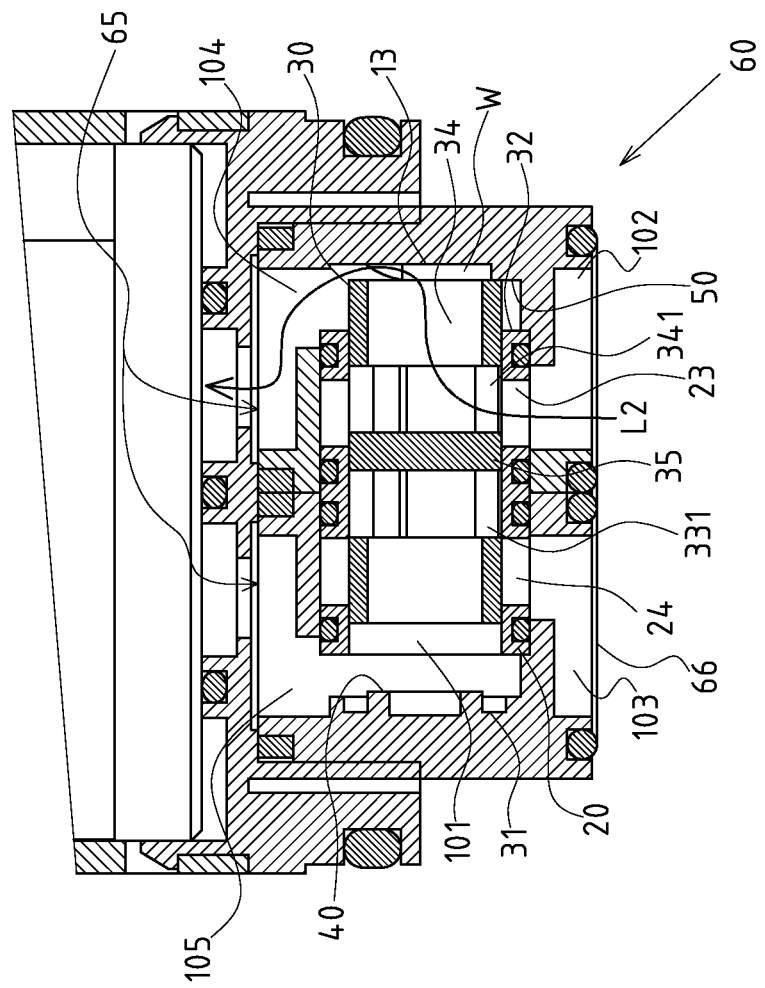
FIG. 6 is a sectional view of the burning-proof balance valve of the present invention when full cold water mode is activated.

Referring to FIG. 6, when the user switches the water supply mode to full cold water mode, the moveable spool 30 shifts towards the second lateral end wall 13, such that the minimum cold water retaining portion 50 is abutted onto the second end 32 of the moveable spool 30, and a minimum flow gap W is reserved between the second end 32 and the second lateral end wall 13, allowing for constant flow of water stream L2 through the cold water slot 34 of the moveable spool 30.

I claim:

1. A burning-proof cold/hot water balance valve apparatus comprising:
 a dual-temperature ceramic valve having a cold water inlet and a hot water inlet arranged in spaced relation at a bottom thereof, said holding space having a cold water outlet and a hot water outlet in spaced relation at a top thereof, said holding space having a first lateral end wall and a second lateral end wall at opposite ends thereof;
 a fixed valve pipe having a transverse hollow pipe, said fixed valve pipe having a first port opposite said first lateral end wall and a second port opposite said second lateral end wall, said fixed valve pipe having a cold water opening connected to said cold water inlet and a hot water opening connected to said hot water inlet, said first port connected to said hot water outlet, said second port connected to said cold water outlet;
 a movable spool transversely assembled into said fixed valve pipe and transversely movable therein, said movable spool having a first end and a second end, said first end recessed so as to form a hot water slot, said second end recessed so as to form a cold water slot, said hot water slot separated by a partition from said cold water slot, said hot water slot having a hot water punch hole connected to said hot water opening of said fixed valve pipe, said cold water slot having a cold water punch hole connected to said cold water opening of said fixed valve pipe;
 a hot water stop flange protruding from said first lateral end wall of said holding space, said hot water stop flange meshed with said first end of said movable spool so as to block a stream of hot water when said first end of said movable spool shifts toward said first lateral end wall; and
 a cold water retaining portion protruding from said second lateral end wall of said holding space, said cold water retaining portion abutting said second end of said movable spool when said second end of said movable spool shifts toward said second lateral end wall such that a minimal flow gap is formed between said second end of said movable spool and said second lateral end wall so as to allow a constant flow of the stream of water through said cold water slot of said movable spool, said ceramic valve being switchable to a full hot water mode such that said movable spool and said hot water stop flange cooperate so as to block the stream of hot water in order to prevent scalding, said ceramic valve switchable to a full cold water mode so as to enable a continuous flow of cold water.

2. The water valve apparatus of claim 1, said ceramic valve having a pedestal at a bottom thereof, said pedestal having an inlet pipe groove formed at a bottom thereof, said inlet pipe groove receiving and positioning a combined inlet pipe assembly, said combined inlet pipe assembly having a cold water pipe and a hot water pipe, said pedestal having a pair of protruding footstands positioned laterally at a bottom thereof, each of said cold water pipe and said hot water pipe having a lower nozzle that is mated with respective upper nozzles of said inlet pipe groove and an open abutting side, said hot water pipe and said cold water pipe having sides defining a portion of said holding space.

3. The water valve apparatus of claim 2, said inlet pipe groove being shaped by a convex ringed frame, said convex ringed frame having an embedded groove formed partially thereon, the upper nozzles having an embedded flange set laterally thereon.

4. The water valve apparatus of claim 1, said hot water stop flange being a protruding ringed body.

5. The water valve apparatus of claim 1, said cold water retaining port having at least one bulge positioned on said second lateral end wall of said holding space.

* * * * *